United States Patent
Alkhulaifi et al.

(10) Patent No.: US 11,618,693 B2
(45) Date of Patent: Apr. 4, 2023

(54) MULTIMODE SYSTEM FOR COOLING AND DESALINATION

(71) Applicant: KING FAHD UNIVERSITY OF PETROLEUM AND MINERALS, Dhahran (SA)

(72) Inventors: Yousif M. Alkhulaifi, Dhahran (SA); Fahad A. Al-Sulaiman, Dhahran (SA); Nasiru I. Ibrahim, Dhahran (SA); Ridha Ben Mansour, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 0 days.

(21) Appl. No.: 17/517,478

(22) Filed: Nov. 2, 2021

(65) Prior Publication Data
US 2022/0135439 A1    May 5, 2022

Related U.S. Application Data

(60) Provisional application No. 63/108,683, filed on Nov. 2, 2020.

(51) Int. Cl.
*C02F 1/16* (2023.01)
*F25B 41/20* (2021.01)
(Continued)

(52) U.S. Cl.
CPC .......... *C02F 1/16* (2013.01); *B01D 1/16* (2013.01); *B01D 5/0006* (2013.01); *B01D 5/006* (2013.01);
(Continued)

(58) Field of Classification Search
CPC .. C02F 1/16; C02F 2103/08; C02F 2201/009; C02F 2303/10; F25B 41/20; F25B 40/06;
(Continued)

(56) References Cited

U.S. PATENT DOCUMENTS

| | | | |
|---|---|---|---|
| 8,496,234 B1 * | 7/2013 | Govindan | C02F 1/048 261/157 |
| 8,647,477 B2 * | 2/2014 | Govindan | B01D 1/16 95/204 |

(Continued)

FOREIGN PATENT DOCUMENTS

| | | |
|---|---|---|
| CN | 102491440 B | 4/2013 |
| CN | 207904067 U | 9/2018 |

(Continued)

OTHER PUBLICATIONS

Yousif M. Alkhulaifi, et al., "Performance and exergoeconomic assessment of a novel combined ejector cooling with humidification-dehumidification (HDH) desalination system", Desalination, vol. 500, Mar. 15, 2021, 3 pages (Abstract only).

(Continued)

*Primary Examiner* — Jonathan Miller
(74) *Attorney, Agent, or Firm* — Oblon, McClelland, Maier & Neustadt, L.L.P.

(57) ABSTRACT

A multimode system for cooling and desalination includes a humidification-dehumidification (HDH) system, an ejector cooling cycle (ECC) system and valves. The HDH system includes a heater, a humidifier and a dehumidifier. The ECC system includes a generator, an evaporator, an ejector and a condenser. The valves are configured to connect to inlets and outlets of the heater, the generator and a heat source so that by selectively opening and closing the valves, the heat source is connected to the heater while disconnected from the generator, or connected to the generator while disconnected from the heater, or connected to both the heater and the generator, or disconnected from both the heater and the generator. The ECC system and the HDH system are connected at the condenser for heat exchange.

19 Claims, 5 Drawing Sheets

(51) Int. Cl.
  *F25B 40/06* (2006.01)
  *B01D 5/00* (2006.01)
  *B01D 1/16* (2006.01)
  *C02F 103/08* (2006.01)

(52) U.S. Cl.
  CPC ......... *B01D 5/0039* (2013.01); *B01D 5/0078* (2013.01); *F25B 40/06* (2013.01); *F25B 41/20* (2021.01); *C02F 2103/08* (2013.01); *C02F 2201/009* (2013.01); *C02F 2303/10* (2013.01); *F25B 2341/0012* (2013.01); *F25B 2400/04* (2013.01); *F25B 2600/25* (2013.01)

(58) Field of Classification Search
  CPC .......... F25B 2341/0012; F25B 2400/04; F25B 2600/25; B01D 1/16; B01D 5/0006; B01D 5/0039; B01D 5/006; B01D 5/0078
  See application file for complete search history.

(56) References Cited

U.S. PATENT DOCUMENTS

| | | | | |
|---|---|---|---|---|
| 9,834,454 B2* | 12/2017 | Frolov | .................. | B01D 3/007 |
| 10,143,936 B2* | 12/2018 | Govindan | .............. | B01D 3/343 |
| 10,513,445 B2* | 12/2019 | Govindan | .............. | B01D 5/006 |
| 10,532,936 B2* | 1/2020 | Al-Azazmeh | .......... | B01D 5/006 |
| 10,981,082 B2* | 4/2021 | Govindan | ................. | C02F 1/04 |
| 11,097,203 B1* | 8/2021 | Aguinaldo | ........... | B01D 5/0039 |
| 11,142,468 B2* | 10/2021 | Qasem | ................ | B01D 5/0051 |
| 2015/0129410 A1* | 5/2015 | Govindan | .............. | B01D 3/225 |
| | | | | 202/185.1 |
| 2020/0263927 A1* | 8/2020 | Chudnovsky | ............. | F28B 9/00 |
| 2022/0135438 A1* | 5/2022 | Al-Sulaiman | ............. | F25B 1/06 |
| | | | | 202/167 |
| 2022/0135439 A1* | 5/2022 | Alkhulaifi | ................ | C02F 1/16 |
| | | | | 203/10 |

FOREIGN PATENT DOCUMENTS

| | | |
|---|---|---|
| CN | 110745896 A | 2/2020 |
| CN | 213811214 U | 7/2021 |

OTHER PUBLICATIONS

M. S. Saadawy, et al., "A Novel Super-Cooled Humidification-Dehumidification System Driven By Thermal Vapor Compression Unit (HDDTVC) For Seawater Desalination", Twelfth International Water Technology Conference, IWTC12, 2008, pp. 1-24.

* cited by examiner

MULTIMODE SYSTEM FOR COOLING AND DESALINATION

CROSS REFERENCE TO RELATED APPLICATIONS

This application claims benefit of priority to U.S. Provisional Patent Application No. 63/108,683 titled "A COMBINED EJECTOR COOLING AND DESALINATION SYSTEM POWERED BY SOLAR ENERGY" and is related to U.S. Provisional Patent Application No. 63/108,693 titled "A HYBRID EJECTOR COOLING AND HUMIDIFICATION-DEHUMIDIFICATION DESALINATION SYSTEM", both of which are incorporated herein by reference in their entireties.

BACKGROUND

Technical Field

The present disclosure is directed generally to cooling and desalination, and more specifically to a multimode system including an ejector cooling cycle (ECC) system and a humidification-dehumidification (HDH) system, and a method for operating the multimode system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Freshwater production and supply is essential for social and economic development. Globally, the high demand for clean water is ever growing with millions of people seeking access to clean drinking water. Due to the scarcity of fresh water, desalination of sea water or saline water has become necessary for sustainable development and better quality of life. Meanwhile, the use of air conditioning systems for comfortable cooling is unavoidable in many parts of the world during the hot summer season. Conventional desalination technologies, such as multi-effect distillation and multi-stage flash distillation, and traditional cooling processes can both be energy-intensive. Integrating cooling systems and desalination systems can help meet the demands for both cooling and fresh water, especially in tropic areas with limited access to clean water.

Some researchers have studied the integration of humidification-dehumidification (HDH) desalination technologies with ejector cooling systems. For instance, CN102491440B discloses a hybrid system including an ejector cooling system and an HDH desalination system. Particularly, a single unit functions as a condenser in the ejector cooling system and as a heater in the HDH system. Another single unit functions as an evaporator in the ejector cooling system and as a dehumidifier in the HDH system. As a result, the cooling effect is "consumed internally" by the dehumidifier and is thus not used by an external space. In addition, a solar system is used to provide heat to the generator and a humidifier.

CN207904067U discloses a hybrid system including an ejector cooling system and an HDH desalination system. Similarly, a single unit functions as a condenser in the ejector cooling system and as a heater in the HDH system.

CN213811214U discloses a hybrid system including a cooling system, a desalination system and a solar system. Unlike ejector cooling, the cooling system in this reference includes an adsorption bed, a condenser and an evaporator. Unlike HDH desalination, the desalination system includes a vacuum freezing chamber, a solid-liquid separator and a melting device. Moreover, saline water is heated in the solar system.

Alkhulaifi et. al. [Performance and exergoeconomic assessment of a novel combined ejector cooling with humidification-dehumidification (HDH) desalination system, incorporated herein by reference in its entirety] discloses a hybrid system including an ejector cooling system and an HDH desalination system. External heat is provided to the generator alone. The heater receives heat from the super-heated stream exiting the ejector.

Saadawy et al. [Novel super-cooled humidification-dehumidification system driven by thermal vapor compression unit (HDDTVC) for seawater desalination, incorporated herein by reference in its entirety] discloses a hybrid system including an ejector cooling system and an HDH desalination system. However, external heat is provided to the generator, the air and the saline water, i.e. three different units. Further, the super-heated stream exiting from the ejector is separated into two streams which pre-heat the air and the saline water respectively. In other words, there appear to be two separate condensers.

Each of the aforementioned references suffers from one or more drawbacks hindering their adoption, as described above. Accordingly, it is an object of the present disclosure to provide systems and methods for a less energy-intensive HDH desalination using synergetic integration with ejector cooling, with a common external heat source providing heat for both the HDH desalination system and the ejector cooling system.

SUMMARY

In an exemplary embodiment, a multimode system for cooling and desalination is provided. The multimode system includes a humidification-dehumidification (HDH) system, an ejector cooling cycle (ECC) system and valves. The HDH system includes a heater for heating saline water, a humidifier for humidifying a carrier gas using the saline water, and a dehumidifier for dehumidifying the carrier gas to obtain desalinated water. The ECC system includes a generator for generating a primary flow of a refrigerant, an evaporator for cooling and providing a secondary flow of the refrigerant, an ejector for the primary flow and the secondary flow to pass through to obtain a super-heated stream of the refrigerant, and a condenser. The valves are configured to connect to inlets and outlets of the heater, the generator and a heat source and configured so that the heat source is connected to the heater while disconnected from the generator, or connected to the generator while disconnected from the heater, or connected to both the heater and the generator, or disconnected from both the heater and the generator. The ECC system and the HDH system are connected at the condenser for heat exchange between the super-heated stream and the saline water to pre-heat the saline water.

In some embodiments, the valves include a first valve connected to an outlet of the heat source and an inlet of the generator. A second valve is connected to an outlet of the generator. A third valve is connected to the second valve and an inlet of the heater. A fourth valve is connected to an outlet of the heater and an inlet of the heat source. In some embodiments, the valves further include a fifth valve connected to the outlet of the heat source and the third valve. A sixth valve is connected to the second valve and the inlet of the heat source.

In some embodiments, the multimode system further includes a controller that is configured to open the first valve, the second valve, the third valve and the fourth valve and close the fifth valve and the sixth valve so that the heat source is connected to both the heater and the generator in a dual-purpose mode during operation. In some embodiments, the generator, the heater and the heat source are configured to define a closed cycle path for a working fluid.

In some embodiments, the multimode system further includes a controller that is configured to open the first valve, the second valve and the sixth valve and close the third valve, the fourth valve and the fifth valve so that the heat source is connected to the generator while disconnected from the heater in a cooling mode during operation.

In some embodiments, the multimode system further includes a controller that is configured to open the third valve, the fourth valve and the fifth valve and close the first valve, the second valve and the sixth valve so that the heat source is connected to the heater while disconnected from the generator in a desalination mode during operation.

In some embodiments, the generator, the ejector and the condenser are configured to define a power cycle of the ECC system. The evaporator, the ejector and the condenser are configured to define a refrigeration cycle of the ECC system. In some embodiments, an outlet of the condenser is connected to an inlet of the generator and an inlet of the evaporator. An outlet of the generator is connected to a first inlet of the ejector. An outlet of the evaporator is connected to a second inlet of the ejector. An outlet of the ejector is connected to an inlet of the condenser.

In some embodiments, the multimode system further includes a fan so that the dehumidifier, the fan and the humidifier are configured to define a closed path cycle for the carrier gas. An outlet of the dehumidifier is connected to an inlet of a fan. An outlet of the fan is connected to an inlet of the humidifier. An outlet of the humidifier is connected to an inlet of the dehumidifier.

In some embodiments, the condenser, the dehumidifier, the heater and the humidifier are configured to define a path for the saline water. An inlet of the dehumidifier is configured to receive saline water. An outlet of the dehumidifier is connected to an inlet of the condenser. An outlet of the condenser is connected to an inlet of the heater. An outlet of the heater is connected to an inlet of the humidifier.

In some embodiments, the humidifier includes a spray tower humidifier, a bubble column humidifier, a wetted-wall tower humidifier or a packed bed tower humidifier.

In some embodiments, the dehumidifier includes a bubble column dehumidifier that includes a sparger configured to receive and sparge a humidified carrier gas into a column of desalinated water above the sparger. A tube goes in and out of the bubble column dehumidifier and includes a coil portion that is configured to be in contact with the column of desalinated water, while in operation, for heat exchange between the saline water in the tube and the column of desalinated water.

In some embodiments, the HDH system includes a U-shaped structure. The U-shaped structure includes the humidifier, a first connection portion and the dehumidifier serially connected. In some embodiments, the multimode system further includes a second connection portion between the humidifier and the dehumidifier so that the humidifier, the first connection portion, the dehumidifier and the second connection portion are configured to define a closed path cycle for the carrier gas.

In some embodiments, at least one of the heater, the generator or the condenser includes a heat exchanger.

In some embodiments, a method for operating the multimode system is provided. The method includes operating the multimode system in a dual-purpose mode while the first valve, the second valve, the third valve and the fourth valve are open, and the fifth valve and the sixth valve are closed. In some embodiment, the method further includes generating the primary flow of the refrigerant in the generator using the heat source.

The primary flow and the secondary flow are passed through the ejector to obtain the super-heated stream of the refrigerant. The super-heated stream is passed through the condenser. The saline water is heated in the heater using the heat source. The carrier gas is humidified in the humidifier using the saline water. The carrier gas is dehumidified in the dehumidifier to obtain the desalinated water. The saline water is pre-heating in the condenser by heat exchange between the saline water and the super-heated stream.

In some embodiments, a method for operating the multimode system is provided. The method includes operating the multimode system in a cooling mode while the first valve, the second valve and the sixth valve are open, and the third valve, the fourth valve and the fifth valve are closed.

In some embodiments, a method for operating the multimode system is provided. The method includes operating the multimode system in a desalination mode while the third valve, the fourth valve and the fifth valve are open, and the first valve, the second valve and the sixth valve are closed.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As mentioned in the Background, both cooling and desalination can be energy-intensive. In both processes, energy mostly comes from fossil fuels that contribute to global warming through greenhouse gas emissions. Consequently, the use of renewable energy sources such as solar energy for water desalination and refrigeration is an attractive alternative. Particularly, ejector cooling is a low-cost, easy, flexible, and reliable system with no moving parts. However, ejector cooling systems are characterized by low thermodynamic performance. System integration to form hybrid ones utilizing a single energy source is one of the strategies to improve their overall energy performance.

Aspects of this disclosure are directed to a multimode system for cooling and desalination. The multimode system includes an ejector cooling cycle (ECC) system and a humidification-dehumidification (HDH) system. A heat source can be configured to provide heat to at least one of a generator of the ECC system or a heater of the HDH system. The multimode system can further include valves for switching operation modes. Particularly, a controller can be configured to selectively open and close the valves so that the heat source is connected to the heater while disconnected from the generator (desalination mode), or connected to the generator while disconnected from the heater (cooling mode), or connected to both the heater and the generator (dual-purpose mode), or disconnected from both the heater and the generator (idle mode).

Methods disclosed herein include a solar-driven combined system for cooling and desalination. An ECC system is integrated with an HDH desalination system. A single-source heating medium provides the input thermal energy to the combined system. In some embodiments, a heating fluid first enters a generator of the ECC to heat a working fluid (e.g. refrigerant) therein. The primary energy input for the HDH system in this configuration is obtained through internal heat recovery from the ECC system. Furthermore, the combined system in this arrangement can operate in different modes: (i) dual-purpose cooling and desalination, (ii) cooling only, and (iii) desalination only. Selective opening and closing of specific valves is utilized to control the mode of operation. With different modes available, a user can operate the combined system according to their needs. For example, the dual-purpose cooling and desalination mode may be chosen in the summer while the desalination (only) mode may be preferred in the winter. The user may also operate in the cooling (only) mode while inspecting or repairing the HDH system, or vice versa.

Figure 1A:
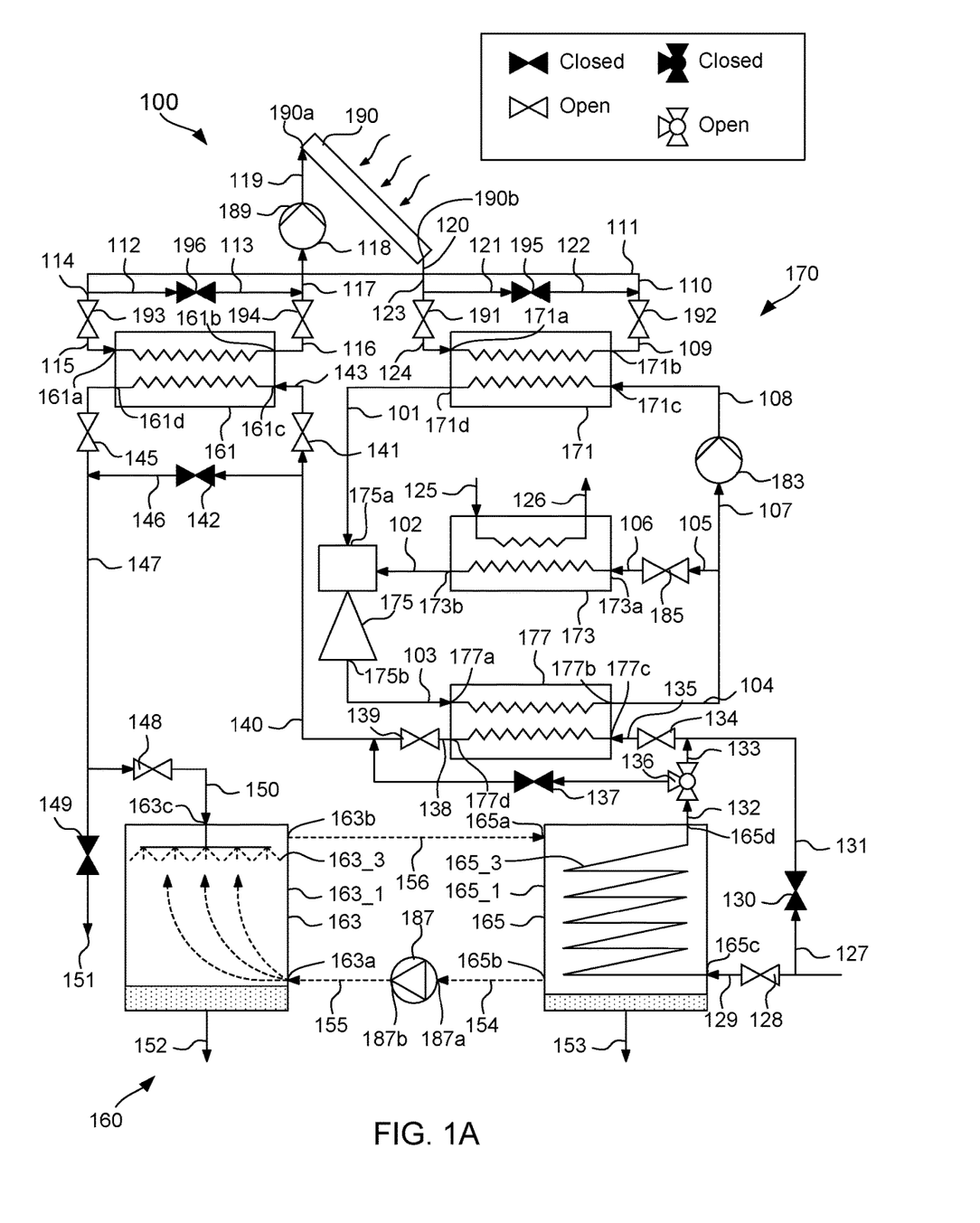
FIG. 1A is a schematic diagram of a multimode system for cooling and desalination in a dual-purpose mode, according to some embodiments of the present disclosure.

FIG. 1A is a schematic diagram of a multimode system 100 for cooling and desalination in a dual-purpose mode, according to some embodiments of the present disclosure. As shown, the multimode system 100 includes an HDH system 160 and an ECC system 170. The HDH system 160 includes a heater 161 for heating saline water, a humidifier 163 for humidifying a carrier gas (e.g. air) using the saline water, and a dehumidifier 165 for dehumidifying the carrier gas to obtain desalinated water. The ECC system 170 includes a generator 171 for generating a primary flow of a refrigerant, an evaporator 173 for cooling and providing a secondary flow of the refrigerant, an ejector 175 for the primary flow and the secondary flow to pass through to obtain a super-heated stream of the refrigerant, and a condenser 177. Note that "saline water" as used herein includes saline water, sea water, brackish water and/or the like.

In the example of FIG. 1A, a heat source 190 can be configured to provide heat to at least one of the HDH system 160 or the ECC system 170. The heat source 190 can include miscellaneous sources such as, but not limited to, solar collectors, waste heat recovery, gas burners, and geothermal energy. In FIG. 1, a solar collector driven system is shown, which can supply heat such that a working fluid (e.g. a stream 120) can exit the heat source 190 with a temperature in the range of 90-120° C., preferably 95-115° C., preferably 100-110° C. The heat source 190 can include various types of solar thermal collectors such as a flat-plate collector, an evacuated tube collector, a parabolic trough, a photovoltaic-thermal collector (PVT), and/or the like. The choice of the type of solar collector depends on the degree of temperature required, technical feasibility, and cost, among others. The working fluid can include water or a thermal oil and is circulated through the solar thermal collector using a pump 189 to transfer the thermal energy from the solar collector directly to a heat-driven system (e.g. the ECC system 170) or to a thermal storage tank (not shown in the diagram). The solar collector is connected to the generator 171 of the ECC system 170 through pipes that may be of different types such as metallic type or plastic-based (polyvinyl chloride, PVC).

As illustrated, valves 191, 192, 193, 194, 195 and 196 can be connected to inlets and outlets of the heater 161, the generator 171 and the heat source 190. In a non-limiting example, a first valve 191 is connected to an outlet 190b of the heat source 190 and a first inlet 171a of the generator 171. A second valve 192 is connected to a first outlet 171b of the generator 171. A third valve 193 is connected to the second valve 192 and a first inlet 161a of the heater 161. A fourth valve 194 is connected to a first outlet 161b of the heater 161 and an inlet 190a of the heat source 190. A fifth valve 195 is connected to the outlet 190b of the heat source 190 and the third valve 193. A sixth valve 196 is connected to the second valve 192 and the inlet 190a of the heat source 190.

While not shown, the multimode system 100 can further include a controller that is configured to open the first valve 191, the second valve 192, the third valve 193 and the fourth 194 valve and close the fifth valve 195 and the sixth valve 196 so that the heat source 190 is connected to both the heater 161 and the generator 171 in a dual-purpose mode during operation. As a result, the generator 171, the heater 161 and the heat source 190 can be configured to define a first closed cycle path for a working fluid. The working fluid enters the heat source 190 as a stream 119 to be heated therein and then exits as the stream 120. The stream 120 passes through the first valve 191 before entering the generator 171 as a stream 124 to provide heat to the ECC system 170. Subsequently, the working fluid exits the generator 171 as a stream 109 and passes through the second valve 192 and then the third valve 193 before entering the heater 161 as a stream 115 to provide heat to the HDH system 160. Next, the working fluid exits the heater 161 as a stream 116, passes through the fourth valve 194, and then is pumped by a pump 189 back to the heat source 190 to be heated again. The first closed cycle path continues. As will be discussed later in FIGS. 1B and 1C, the controller can also be configured to open and close the valves 191-196 differently so that the multimode system 100 is operated in a different mode. In one embodiment, the controller includes a micro-processor so that the controller can be programmed with instructions. As a result, a user can switch modes of the multimode system 100 by pushing buttons of the controller. In another embodiment, the multimode system 100 does not include a controller. The user may manually adjust the valves. Accordingly, a different closed cycle path can be defined for the working fluid. Further, while the working fluid is shown to leave the heat source 190 and enters the generator 171 before entering the heater 161 in this example, the working fluid can alternatively leave the heat source 190 and enters the heater 161 before entering the generator 171 in other examples.

As shown in FIG. 1A, the ECC system 170 includes the generator 171, the evaporator 173, the ejector 175 and the condenser 177. The generator 171, the ejector 175 and the condenser 177 can be configured to define a power cycle of the ECC system for an internal working fluid (also referred to as the refrigerant) during operation. The evaporator 173, the ejector 175 and the condenser 177 can be configured to define a refrigeration cycle of the ECC system for the refrigerant during operation. Different refrigerants can be used in the ECC system 170, such as R134a, R290, R600, R600a, R245fa, etc. As mentioned earlier, the heat source 190 can provide heat to the generator 171 to obtain the primary flow 101 of the refrigerant. For example, heat can be supplied to the generator 171 by the stream 124 (or the stream 120) from a low-grade heat source such as waste heat at a temperature around 100° C. to vaporize the refrigerant to obtain a supersonic refrigerant vapor as the primary flow 101.

Figure 2:
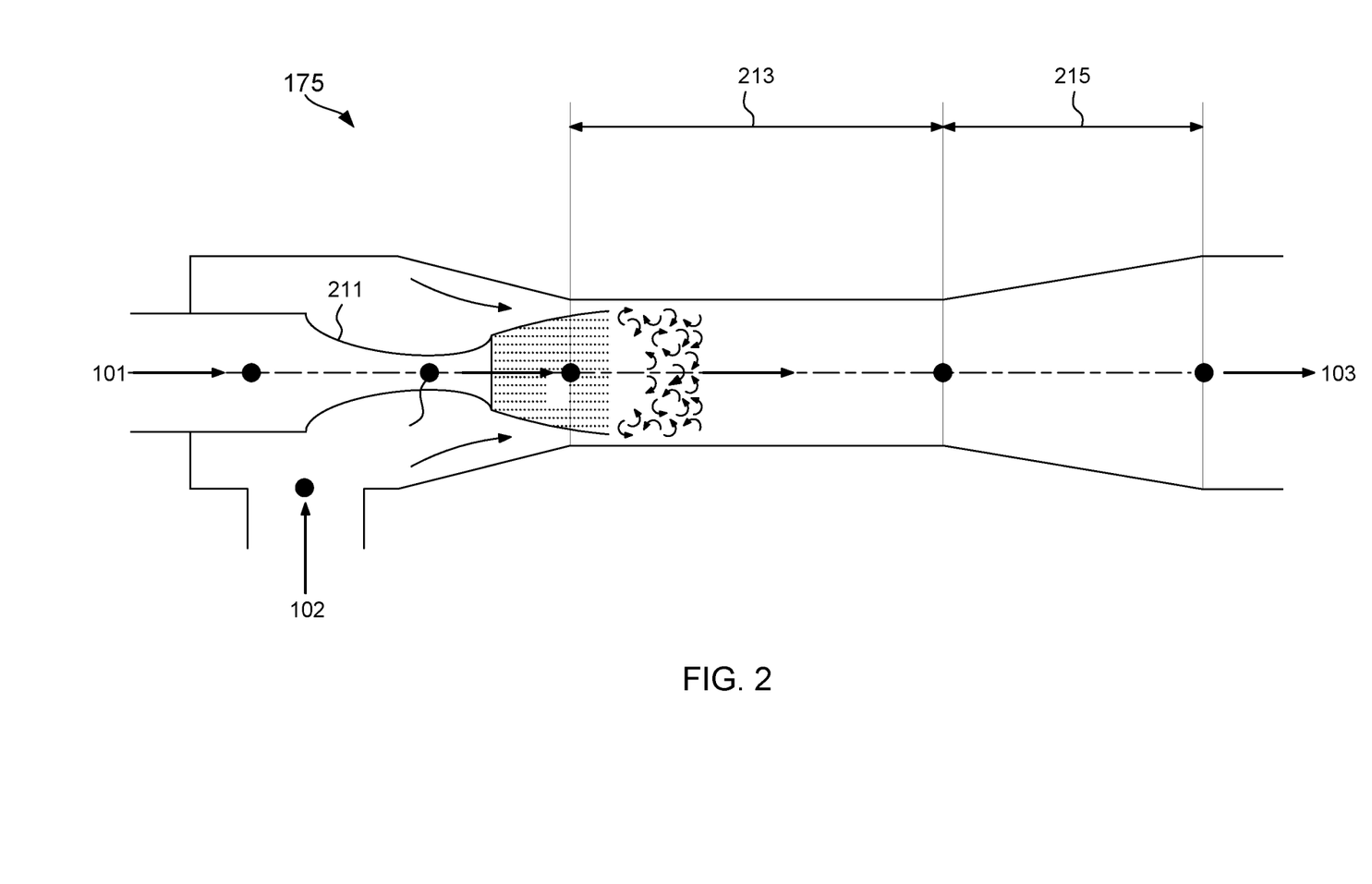
FIG. 2 is a schematic of an ejector, according to some embodiments of the present disclosure.

FIG. 2 is a schematic of the ejector 175 in FIG. 1A, according to some embodiments of the present disclosure. As illustrated, the primary flow 101 can expand in a nozzle 211, such as a convergent-divergent nozzle, to become supersonic at an outlet of the nozzle 211. The primary flow 101 then flows into a mixing chamber 213 of the ejector 175 with a strong disturbance caused by the immediate increase of the flow channel area. The mixing chamber 213 can be designed as a segment having a constant cross-sectional area but often has a tapered inlet section. The low pressure created at an outlet of the nozzle 211 of the ejector 175 allows the secondary flow 102 to be sucked due to the vacuum created. The secondary flow 102 is provided by the evaporator 173. The secondary flow 102 that is low-pressure can be entrained by the primary flow 101 that is high-velocity, resulting in acceleration until becoming supersonic in the constant-area section. The two flows undergo a constant pressure mixing in the ejector 175. During mixing, a transfer of momentum from the primary flow 101 to the secondary flow 102 results in a deceleration of the combined flow followed by recompression due to a normal shock. That is, a mixed refrigerant vapor of the primary flow 101 and the secondary flow 102 undergoes a sudden drop in velocity and an increase in pressure due to the development of normal shock in the mixing chamber 213 and then passes through a diffuser 215 of the ejector 175, where the pressure recovery takes place. The diffuser 215 further decelerates the mixed refrigerant vapor at the outlet of the ejector 175. As a result, a mixed refrigerant (also referred to as the super-heated stream) 103 exits the ejector 175 at a superheated state. For example, the mixed refrigerant 103 can exit the ejector 175 at a temperature around 40-60° C., preferably around 45-55° C., preferably around 50° C., depending on the type of refrigerant used and the amount of input energy to the generator 171. The significant presence of thermal energy at the outlet of the ejector 175, i.e. the super-heated stream 103, is utilized to power a first-stage heating of saline water (e.g. a stream 135) in the HDH system 160.

Referring back to FIG. 1A, the mixed refrigerant 103 enters the condenser 177 and is cooled down by the stream 135 in the HDH system 160, which will be explained in detail later. As a result, a stream 104, such as a condensed refrigerant or a saturated liquid, exits the condenser 177 and is distributed or separated into two streams. One stream of the two streams is pumped back to the generator 171 as a stream 108 by a pump 183 (to raise pressure to the generator condition). The refrigerant leaving the pump 183 (the stream 108) can be heated and vaporized in the generator 171 to become a saturated vapor as the primary flow 101. The other stream of the two streams is expanded through a valve 185, such as an expansion or throttling valve, where both temperature and pressure of a stream 105 are decreased to obtain a stream 106. For example, the stream 106 can enter the evaporator 173 at a temperature of about 5° C. The stream 106 is evaporated by an external circulating working fluid (a stream 125) in the evaporator 173 and produces a cooling effect, e.g. for air conditioning applications. That is, the stream 125 absorbs the latent heat of evaporation of the refrigerant. Consequently, a low-pressure vaporized vapor (also referred to as a stream 102 or the secondary flow 102) exits the evaporator 173 and is then sucked by the high-pressure motive stream (e.g., the primary flow 101) in the ejector 175. The power cycle and the refrigeration cycle of the ECC system continue.

Figure 3:
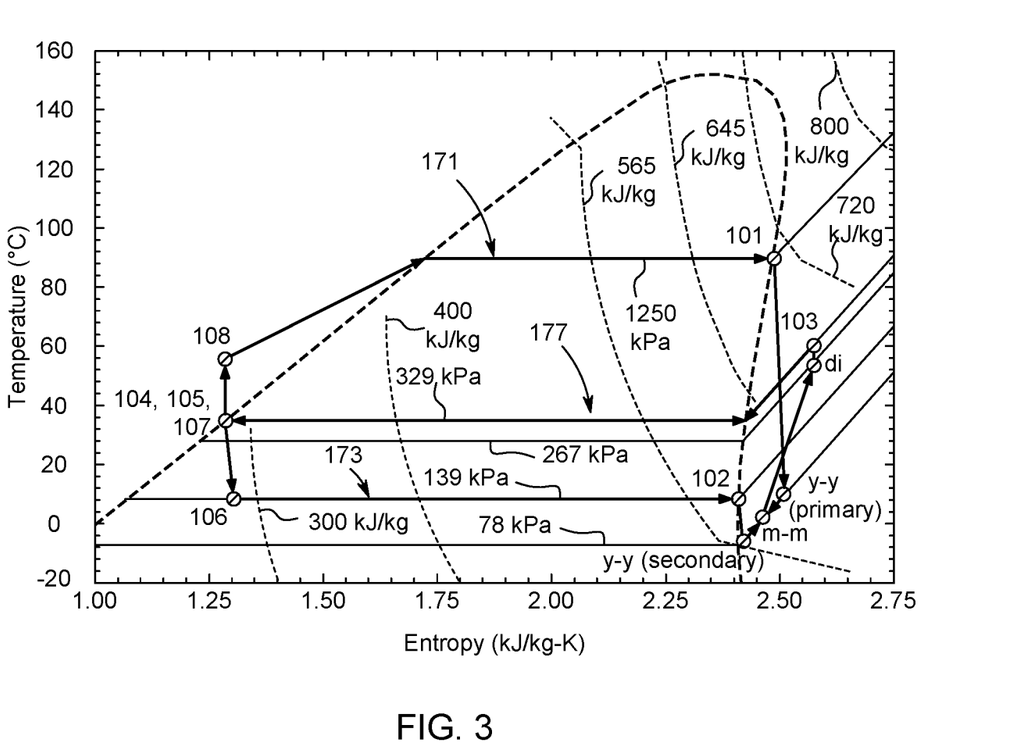
FIG. 3 is a temperature-entropy diagram of an ejector cooling cycle (ECC) system, according to some embodiments of the present disclosure.

The entrainment ratio of the ejector 175, which is the ratio between the secondary mass flow rate (the secondary flow 102) and the primary mass flow rate (the primary flow 101), governs the division of streams after the condenser 177. FIG. 3 is a temperature-entropy diagram of the ECC system 170, according to some embodiments of the present disclosure. As shown, the stream 105 passes through a thermostatic expansion valve (e.g. the valve 185) and undergoes an isenthalpic expansion to form a two-phase state at lower pressure and temperature (the stream 106). The refrigerant enters the evaporator 173 (the stream 106) to absorb heat from the conditioned space to become a saturated vapor at an outlet (the stream 102). After the evaporator 173 (the stream 102), the refrigerant enters a secondary flow side of the ejector 175 (the stream 102), and the process repeats.

FIG. 3 shows temperature, pressure and entropy conditions of various components of the ECC system 170 during operation. For example, the stream 101 can have a temperature range of 80-100° C., preferably 85-95° C., preferably around 90° C. and a pressure range of 1100-1400 kPa, preferably 1150-1350 kPa, preferably 1200-1300 kPa. The stream 102 can have a temperature range of 0-16° C., preferably 3-13° C., preferably around 6-10° C. and a pressure range of 100-180 kPa, preferably 120-160 kPa, preferably 130-150 kPa. The stream 103 can have a temperature range of 45-75° C., preferably 50-70° C., preferably around 55-65° C. and a pressure range of 400-700 kPa, preferably 450-650 kPa, preferably 500-600 kPa. The stream 104, 105 or 107 can have a temperature range of 20-50° C., preferably 25-45° C., preferably around 30-40° C. and a pressure range of 150-500 kPa, preferably 250-400 kPa, preferably 300-350 kPa. The stream 106 can have a temperature range of 0-16° C., preferably 3-13° C., preferably around 6-10° C. and a pressure range of 100-180 kPa, preferably 120-160 kPa, preferably 130-150 kPa. The stream 108 can have a temperature range of 45-75° C., preferably 50-70° C., preferably around 55-65° C. and a pressure range of 400-700 kPa, preferably 450-650 kPa, preferably 500-600 kPa.

Note that the multimode system 100 is in the dual-purpose mode in the FIG. 1A example. Accordingly, the ECC system 160 and the HDH system 170 are connected at the condenser 177 for heat exchange between the super-heated stream 103 and the stream 135, such as saline water (to pre-heat the saline water). The saline water exits the condenser 177 as a stream 138. This arrangement eliminates the use of a separate heat rejection fluid for the ECC system 170, and at the same time, pre-heats the saline water. The pre-heated saline water by the condenser 177, (which could be up to about 15° C. increase in temperature), can minimize the required input energy by the HDH system 160. A water pump (not shown) which is used to circulate the saline water can be a centrifugal pump or a positive displacement type, depending on the practical requirement.

In some embodiments, the condenser 177 includes a heat exchanger for heat exchange between the saline water within the HDH system 160 and the refrigerant within the ECC system 170. The term "heat exchanger" is used to include any heat exchange mechanism through which a coolant or a heat transfer medium can circulate. In some examples, the condenser 177 may include one or more discrete heat exchange devices coupled in series or in parallel. The condenser 177 may include any type of heat exchanger, such as a plate-type heat exchanger, a shell-type heat exchanger, a double-pipe heat exchanger or the like, which generally provides an enlarged effective heat exchanging area by, for example, being corrugated and/or provided with protruding portions of some suitable kind, such as flanges, to allow for heat transfer between two fluids. Note that the heater 161 and the generator 171 can also include a heat exchanger respectively.

In one embodiment, the condenser 177 includes a shell-type heat exchanger, which includes a shell structure and one or more tube structures inside the shell structure. A first fluid can flow through the one or more tube structures while a second fluid can flow over the tube structures (i.e., through the shell structure) so that heat is exchanged between the first fluid and the second fluid. The tube structures can include a thermal-conductive material to facilitate heat exchange between the first fluid and the second fluid, while the shell structures may include a thermal-insulating material to reduce heat loss to or heat gain from the environment. Further, the number of the tube structures, dimensions of the shell structure and the tube structures, geometry of the shell structure and the tube structures, etc. can be tailored to meet specific design requirements.

In another embodiment, the condenser 177 includes a plate-type heat exchanger, which includes a plurality of plates stacked in series along a longitudinal axis, with the plates having the shape of a rectangle or square, or alternatively circular or cylindrical. The stack of plates can include an alternating series of hot plates (hot fluid plates) and cold plates (cold fluid plates) to allow for heat exchange.

Still referring to FIG. 1A, the HDH system 160 includes the heater 161, the humidifier 163, and the dehumidifier 165. The multimode system 100 in the dual-purpose mode exploits heat rejected by the condenser 177 and heat provided by the heat source 190 to heat saline water. In the example of FIG. 1, a closed-air, open-water (CAOW) water-heated HDH cycle is shown. Saline water (a stream 129) at a typical temperature range of 10-35° C., preferably 15-30° C., preferably 20-25° C., enters the dehumidifier 165 by a circulating pump (not shown) to cool and condense incoming humid air (a stream 156), thereby producing fresh water (a stream 153). The circulating pump can be of any type, such as centrifugal or positive displacement type, depending on practical requirements. In the dehumidifier 165, the saline water is pre-heated by the latent heat of condensation and exits as a stream 132 before entering the condenser as the stream 135. The multimode system 100 utilizes heat dissipated from the condenser 177 to further pre-heat the saline water before the saline water passes through the heater 161. Subsequently, the heater 161 heats the saline water to a suitable temperature (50-70° C., preferably 55-65° C., preferably around 60° C.) for humidification. The saline water (a stream 144) heated then enters the humidifier 163 as a stream 150, where the stream 150 humidifies an incoming airstream to obtain humid air (a stream 156). The humid air then moves to the dehumidifier 165, where the humid air is cooled and dehumidified. The dehumidification process produces fresh water, which is then discharged as the stream 153. After the dehumidification, the air is recirculated as a stream 155 by a fan 187 to the humidifier 163. In addition, the HDH system 160 may include a closed-air, closed-water HDH cycle, or an open-air, closed-water HDH cycle, or an open-air, open-water HDH cycle in other examples (not shown).

In this embodiment, the humidifier 163 includes a spray tower humidifier that includes a vessel 163_1. A plurality of nozzles 163_3 can be placed in the vessel 163_1 and configured to spray the stream 150 (e.g., heated saline water) downward while the stream 155 (e.g., air) enters the vessel 163_1 from a bottom of the vessel 163_1 and moves upward to exit from a top of the vessel 163_1. Such countercurrent flows of the streams 150 and 155 can promote heat and mass transfer between the heated saline water and the air. As a result, a portion of the (sprayed) saline water evaporates and is carried by the humid air (the stream 156) to the dehumidifier 165. Meanwhile, the remaining saline water falls to a brine basin (a stream 152). In another embodiment, the humidifier 163 may include a bubble column humidifier, a wetted-wall tower humidifier or a packed bed tower humidifier.

In this example, the dehumidifier 165 includes a vessel 165_1 and one or more cooling coils 165_3 in the vessel. Warm humid air can be passed through the vessel 165_1 in an opposite direction to the saline water in the one or more cooling coils 165_3. Herein, heat exchange can take place on outer surfaces of the cooling coils 165_3 between the warm humid air and the saline water. As a result, condensation occurs on outer surfaces of the relatively cold coils 165_3, resulting in the formation of freshwater droplets. The droplets subsequently fall and are collected in a distillate basin to be discharged out of the system (the stream 153).

In another example, the dehumidifier 165 includes a bubble column dehumidifier (not shown). The bubble column dehumidifier can include a vessel. A sparger can be positioned near a bottom of the vessel and configured to receive and sparge a warm humidified carrier gas into a column of desalinated water above the sparger. A tube that goes in and out of the bubble column dehumidifier can includes a coil portion that is configured to be in contact with the column of desalinated water, while in operation, for heat exchange between the saline water in the tube and the column of desalinated water. Water condensation or formation of freshwater droplets can therefore occur on interfaces between the column of desalinated water and bubbles of the sparged warm humidified carrier gas.

In some embodiments, the HDH system 160 includes a U-shaped structure (not shown) wherein the U-shaped structure includes the humidifier 163, a first connection portion and the dehumidifier 165 serially connected. For example, the humidifier 163 can include the aforementioned spray tower humidifier while the dehumidifier 165 can include the vessel 165_1 and the cooling coils 165_3. Air is passed though the aforementioned spray tower humidifier in an upward direction before entering the first connection portion which is curved. As a result, the air is directed to pass through the vessel 165_1 and the cooling coils 165_3 in a downward direction. Further, the HDH system 160 can include a second connection portion (not shown) between the humidifier 163 and the dehumidifier 165. Consequently, the humidifier 163, the first connection portion, the dehumidifier 165 and the second connection portion are configured to define a closed path cycle for the carrier gas. In other words, during operation, the air can circulate through, in sequence, the humidifier 163, the first connection portion, the dehumidifier 165 and the second connection portion.

As mentioned earlier, the power cycle and the refrigeration cycle of the ECC system 170 are defined for the refrigerant during operation. In some embodiments, a first outlet 177b of the condenser 177 is connected to a second inlet 171c of the generator 171 and an inlet 173a of the evaporator 173. A second outlet 171d of the generator 171 is connected to a first inlet 175a of the ejector 175 while an outlet 173b of the evaporator 173 is connected to a second inlet 175c of the ejector 175. An outlet 175b of the ejector 175 is connected to a first inlet 177a of the condenser 177.

In some embodiments, the dehumidifier 165, the fan 187 and the humidifier 163 are configured to define a closed path cycle for the carrier gas. Particularly, a first outlet 165b of the dehumidifier 165 is connected to an inlet 187a of the fan 187. An outlet 187b of the fan 187 is connected to a first inlet 163a of the humidifier 165. A first outlet 163b of the humidifier 165 is connected to a first inlet 165a of the dehumidifier 165. In some embodiments, the dehumidifier 165, the condenser 177, the heater 161 and the humidifier 163 are configured to define a path for the saline water. Specifically, a second inlet 165c of the dehumidifier 165 is configured to receive saline water, for example by a water pump (not shown) from a sea water reservoir. A second outlet 165d of the dehumidifier 165 is connected to a second inlet 177c of the condenser 177. A second outlet 177d of the condenser 177 is connected to a second inlet 161c of the heater 161. A second outlet 161d of the heater 161 is connected to a second inlet 163c of the humidifier 163.

As mentioned earlier, the multimode system 100 is in the dual-purpose mode in the example of FIG. 1A, with the heat source 190 connected to both the heater 161 and the generator 171. Accordingly, the first valve 191, the second valve 192, the third valve 193 and the fourth 194 valve are open while the fifth valve 195 and the sixth valve 196 are closed. Further, valves 128, 134, 136, 139, 141, 145 and 148 are opened while valves 130, 137, 142 and 149 are closed. When the valves are open and closed differently, the multimode system 100 can be configured to operate in a different mode. For instance, FIGS. 1B and 1C show schematic diagrams of the multimode system 100 in a cooling mode and a desalination mode, respectively, according to some embodiments of the present disclosure.

Figure 1B:
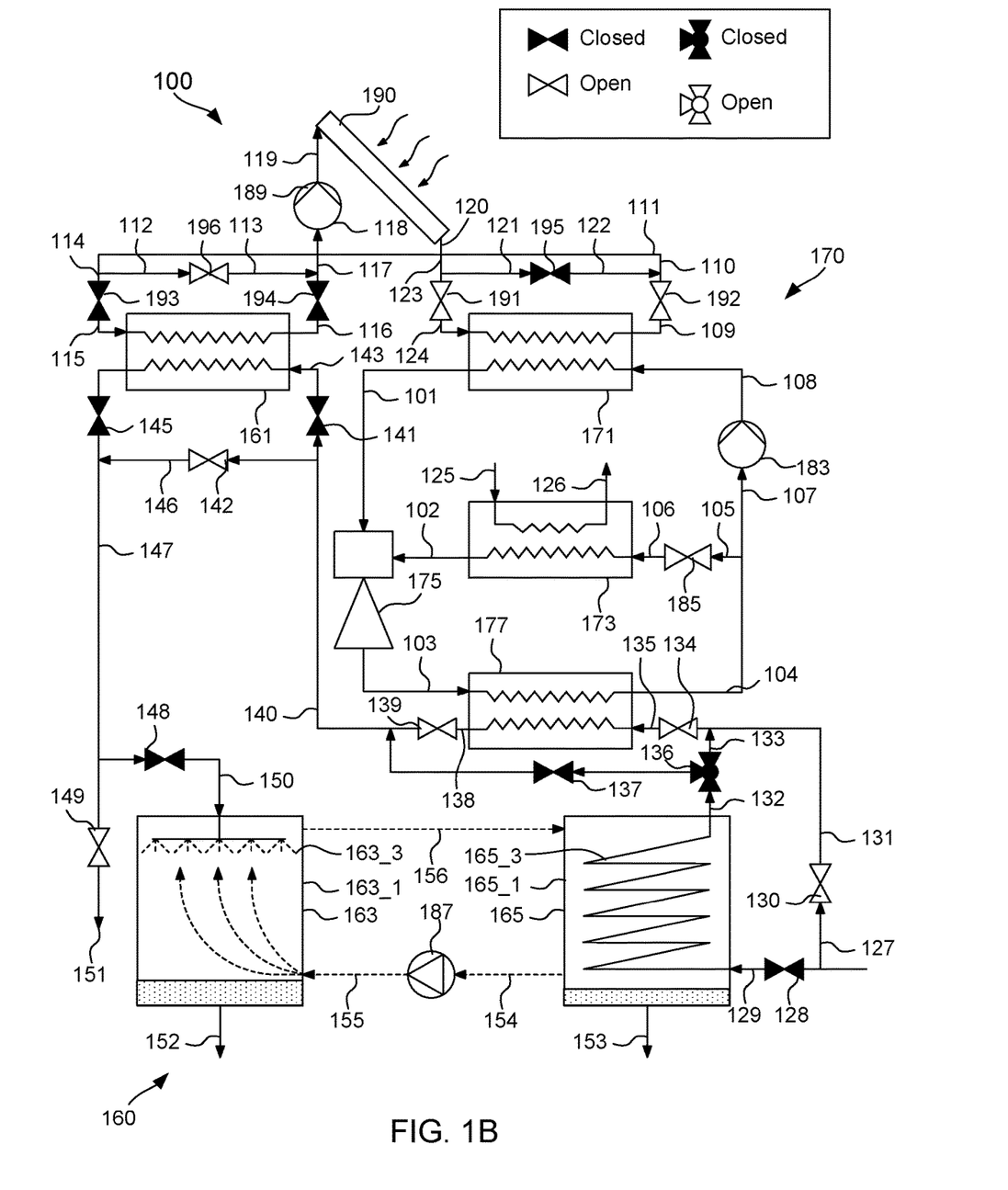
FIG. 1B is a schematic diagram of the multimode system in a cooling mode, according to some embodiments of the present disclosure.
Figure 1C:
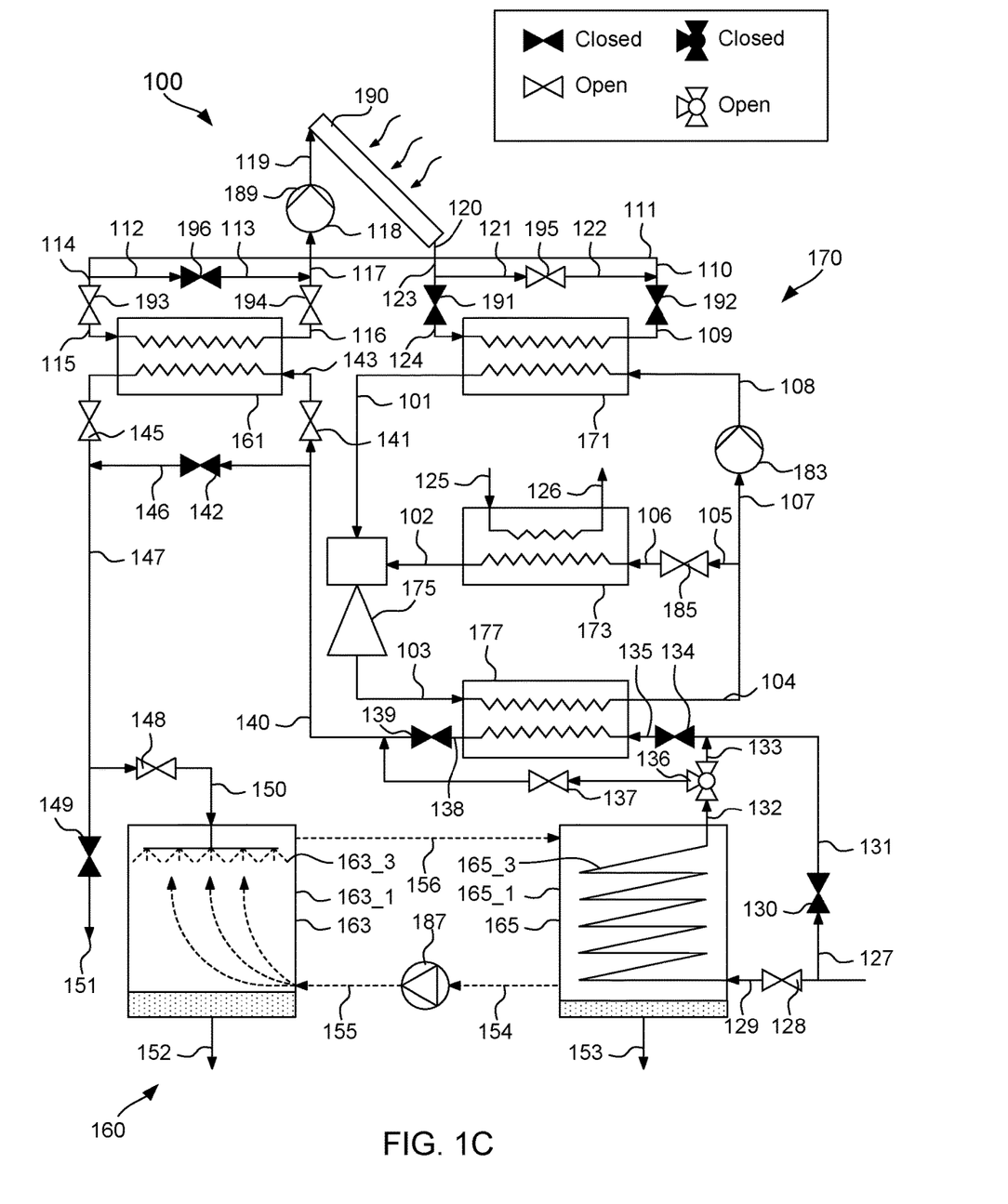
FIG. 1C is a schematic diagram of the multimode system in a desalination mode, according to some embodiments of the present disclosure.

In FIG. 1B, a controller (not shown) can be configured to open the first valve 191, the second valve 192 and the sixth valve 196 and close the third valve 193, the fourth valve 194 and the fifth valve 195 so that the heat source 190 is connected to the generator 171 while disconnected from the heater 161 in the cooling mode during operation. As a result, the generator 171 and the heat source 190 can be configured to define a second closed cycle path for the working fluid. The working fluid enters the heat source 190 as the stream 119 to be heated therein and then exits as the stream 120. The stream 120 passes through the first valve 191 before entering the generator 171 as the stream 124 to provide heat to the ECC system 170. Subsequently, the working fluid exits the generator 171 as the stream 109 and passes through the second valve 192 and then the sixth valve 196. Next, the working fluid is pumped by the pump 189 back to the heat source 190 to be heated again. The second closed cycle path continues.

In both the dual-purpose mode and the cooling mode, the ECC system 170 operates similarly. However, a coolant in the condenser 177 and a cycle path for the coolant are different. As shown in FIG. 1B, a cooling stream is directed to the condenser 177 without having to pass through the dehumidifier 165 first. The cooling stream then proceeds to valves 142 and 149 before leaving the multimode system 100. Further, valves 130, 134, 139, 142 and 149 are opened while valves 128, 136, 137, 141, 145 and 148 are closed. Note that the valve 136 is a three-way valve.

The cooling mode, as shown in FIG. 1B, is used when only cooling is required, but not desalination of seawater. The layout can be identical to the dual-purpose mode. However, different valves are opened and closed to disconnect the HDH system 160 from the heat source 190. A cooling stream 127 of any suitable substance can enter the multimode system 100 and be directed to the condenser 177 (the stream 135) to absorb the heat rejected by the ECC system 170. The cooling stream leaves the condenser at an elevated temperature (the stream 138) and bypasses the heater 161 (a stream 146), and is subsequently discharged from the system (the stream 151).

In FIG. 1C, a controller (not shown) can be configured to open the third valve 193, the fourth valve 194 and the fifth valve 195 and close the first valve 191, the second valve 192 and the sixth valve 196 so that the heat source 190 is connected to the heater 161 while disconnected from the generator 171 in a desalination mode during operation. As a result, the heater 161 and the heat source 190 can be configured to define a third closed cycle path for the working fluid. The working fluid enters the heat source 190 as a stream 119 to be heated therein and then exits as the stream 120. The stream 120 passes through the fifth valve 195 and then the third valve 193 before entering the heater 161 as the stream 115 to provide heat to the HDH system 160. Next, the working fluid exits the heater 161 as the stream 116, passes through the fourth valve 194, and then is pumped by the pump 189 back to the heat source 190 to be heated again. The third closed cycle path continues.

In both the dual-purpose mode and the desalination mode, the HDH system 160 operates similarly. However in the desalination mode, the saline water (the stream 132) exiting from the dehumidifier 165 passes through the valves 137 instead of passing through the condenser 177. The saline water then proceeds to the heater 161 to be heated therein. In other words, the saline water is not pre-heated by the condenser 177. Further, valves 128, 136, 137, 141, 145 and 148 are opened while valves 130, 134, 139, 142 and 149 are closed.

The desalination mode is used when only fresh water is required, but not cooling. The layout can be identical to the dual-purpose mode. However, different valves are opened and closed to disconnect the generator 171 from the heat source 190 as well as disconnect the condenser 177 from the HDH system 160, as shown in FIG. 1C.

Coefficient of performance (COP) of the ECC system 170 can be obtained by dividing refrigeration (heated absorbed by the evaporator 173) by the sum of heat input to the generator 171 and power consumed by the pump 183. The dual purpose-mode improves the COP by at least 5%, preferably at least 10%, preferably between 15 and 30%, compared to the cooling mode or a conventional ejector cooling system uncoupled to an HDH system. Efficiency of the HDH system 160 is defined by Narayan et al. [Energy Effectiveness of Simultaneous Heat and Mass Exchange Devices, incorporated herein in its entirety]. The dual purpose-mode improves the efficiency of the HDH system 160 by at least 5%, preferably at least 10%, preferably between 15 and 30%, compared to the desalination mode or a conventional HDH system uncoupled to an ECC system.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A multimode system for cooling and desalination, the multimode system comprising:
a humidification-dehumidification (HDH) system comprising a heater for heating saline water, a humidifier for humidifying a carrier gas using the saline water, and a dehumidifier for dehumidifying the carrier gas to obtain desalinated water;
an ejector cooling cycle (ECC) system comprising a generator for generating a primary flow of a refrigerant, an evaporator for cooling and providing a secondary flow of the refrigerant, an ejector for the primary flow and the secondary flow to pass through to obtain a super-heated stream of the refrigerant, and a condenser; and
a plurality of valves configured to connect to inlets and outlets of the heater, the generator and a heat source and configured so that the heat source is connected to the heater while disconnected from the generator, or connected to the generator while disconnected from the heater, or connected to both the heater and the generator, or disconnected from both the heater and the generator,
wherein the plurality of valves is configured to be selectively opened and closed to switch between at least four modes of the multimode system including a dual-purpose mode, a cooling mode, a desalination mode and an idle mode, and the plurality of valves comprises:
a first valve connected to an outlet of the heat source and an inlet of the generator,
a second valve connected to an outlet of the generator,
a third valve connected to the second valve and an inlet of the heater,
a fourth valve connected to an outlet of the heater and an inlet of the heat source,
a fifth valve connected to the outlet of the heat source and the third valve, and
a sixth valve connected to the second valve and the inlet of the heat source,
wherein the ECC system and the HDH system are connected at the condenser for heat exchange between the super-heated stream and the saline water to pre-heat the saline water.

2. The multimode system of claim 1, further comprising:
a controller configured to open the first valve, the second valve, the third valve and the fourth valve and close the fifth valve and the sixth valve so that the heat source is connected to both the heater and the generator in the dual-purpose mode during operation.

3. The multimode system of claim 2, wherein:
the generator, the heater and the heat source are configured to define a closed cycle path for a working fluid.

4. The multimode system of claim 1, further comprising:
a controller configured to open the first valve, the second valve and the sixth valve and close the third valve, the fourth valve and the fifth valve so that the heat source is connected to the generator while disconnected from the heater in the cooling mode during operation.

5. The multimode system of claim 1, further comprising:
a controller configured to open the third valve, the fourth valve and the fifth valve and close the first valve, the second valve and the sixth valve so that the heat source is connected to the heater while disconnected from the generator in the desalination mode during operation.

6. The multimode system of claim 1, wherein:
the generator, the ejector and the condenser are configured to define a power circuit of the ECC system, and
the evaporator, the ejector and the condenser are configured to define a refrigeration circuit of the ECC system.

7. The multimode system of claim 6, wherein:
an outlet of the condenser is connected to an inlet of the generator and an inlet of the evaporator,
an outlet of the generator is connected to a first inlet of the ejector,
an outlet of the evaporator is connected to a second inlet of the ejector, and
an outlet of the ejector is connected to an inlet of the condenser.

8. The multimode system of claim 1, further comprising a fan so that the dehumidifier, the fan and the humidifier are configured to define a closed path cycle for the carrier gas, wherein:
an outlet of the dehumidifier is connected to an inlet of a fan,
an outlet of the fan is connected to an inlet of the humidifier, and
an outlet of the humidifier is connected to an inlet of the dehumidifier.

9. The multimode system of claim 1, wherein the condenser, the dehumidifier, the heater and the humidifier are configured to define a path for the saline water, wherein:
an inlet of the dehumidifier is configured to receive the saline water,
an outlet of the dehumidifier is connected to an inlet of the condenser,
an outlet of the condenser is connected to an inlet of the heater, and
an outlet of the heater is connected to an inlet of the humidifier.

10. The multimode system of claim 1, wherein the humidifier comprises a spray tower humidifier, a bubble column humidifier, a wetted-wall tower humidifier or a packed bed tower humidifier.

11. The multimode system of claim 1, wherein the dehumidifier comprises a bubble column dehumidifier including:
a sparger configured to receive and sparge a humidified carrier gas into a column of desalinated water above the sparger; and
a tube going in and out of the bubble column dehumidifier and including a coil portion that is configured to be in contact with the column of desalinated water, while in operation, for heat exchange between the saline water in the tube and the column of desalinated water.

12. The multimode system of claim 1, wherein the HDH system comprises a U-shaped structure wherein the U-shaped structure includes the humidifier, a first connection portion and the dehumidifier serially connected.

13. The multimode system of claim 12, wherein the HDH system further comprises a second connection portion between the humidifier and the dehumidifier so that the humidifier, the first connection portion, the dehumidifier and the second connection portion are configured to define a closed path cycle for the carrier gas.

14. The multimode system of claim 1, wherein:
at least one of the heater, the generator or the condenser comprises a heat exchanger.

15. A method for operating the multimode system according to claim 1, the method comprising:
operating the multimode system in the dual-purpose mode while the first valve, the second valve, the third valve and the fourth valve are open, and the fifth valve and the sixth valve are closed.

16. The method of claim 15, further comprising:
generating the primary flow of the refrigerant in the generator using the heat source;
passing the primary flow and the secondary flow through the ejector to obtain the super-heated stream of the refrigerant;
passing the super-heated stream through the condenser;
heating the saline water in the heater using the heat source;
humidifying the carrier gas in the humidifier using the saline water;
dehumidifying the carrier gas in the dehumidifier to obtain the desalinated water; and
pre-heating the saline water in the condenser by heat exchange between the saline water and the super-heated stream.

17. A method for operating the multimode system according to claim 1, the method comprising:
operating the multimode system in the cooling mode while the first valve, the second valve and the sixth valve are open, and the third valve, the fourth valve and the fifth valve are closed.

18. A method for operating the multimode system according to claim 1, the method comprising:
operating the multimode system in the desalination mode while the third valve, the fourth valve and the fifth valve are open, and the first valve, the second valve and the sixth valve are closed.

19. The multimode system of claim 1, further comprising:
a controller configured to selectively open and close the plurality of valves to switch between the at least four modes of the multimode system.

* * * * *